United States Patent [19]

Harper et al.

[11] Patent Number: 5,077,117
[45] Date of Patent: Dec. 31, 1991

[54] PAVEMENT MARKING MATERIAL WITH RUPTURING TOP LAYER

[75] Inventors: James H. C. Harper; Raymond E. Grunzinger, Jr., both of St. Paul, Minn.

[73] Assignee: Minnesota Mining and Manufacturing Company, St. Paul, Minn.

[21] Appl. No.: 504,951

[22] Filed: Apr. 5, 1990

[51] Int. Cl.$^5$ .............. G02B 5/12; E01F 9/04; B32B 5/16

[52] U.S. Cl. .................. 428/143; 428/136; 428/149; 428/172; 428/325; 428/354; 428/423.1; 428/413; 428/474.4; 428/480; 428/913; 404/14

[58] Field of Search .............. 428/136, 143, 144, 172, 428/325, 354, 423.1, 413, 474.4, 480, 913; 404/14

[56] References Cited

U.S. PATENT DOCUMENTS

| 3,379,562 | 4/1968 | Freeman | 117/122 |
|---|---|---|---|
| 3,935,365 | 1/1976 | Eigenmann | 428/323 |
| 4,020,211 | 4/1977 | Eigenmann | 428/323 |
| 4,117,192 | 9/1978 | Jorgensen | 428/337 |
| 4,248,932 | 2/1981 | Tung et al. | 428/325 |
| 4,418,110 | 11/1983 | May et al. | 428/144 X |
| 4,530,859 | 7/1985 | Grunzinger, Jr. | 427/385.5 |
| 4,725,494 | 2/1988 | Belisle et al. | 428/325 |
| 4,808,471 | 2/1989 | Grunzinger | 428/325 |
| 4,937,127 | 6/1990 | Haenggi et al. | 428/212 X |

FOREIGN PATENT DOCUMENTS 0162229 11/1985 European Pat. Off. .
0206670 12/1986 European Pat. Off. .
0346021 12/1989 European Pat. Off. .

Primary Examiner—Patrick J. Ryan
Assistant Examiner—William P. Watkins, III
Attorney, Agent, or Firm—Gary L. Griswold; Walter N. Kirn; David B. Kagan

[57] ABSTRACT

A pavement marking material comprises a flexible base sheet that is conformable to an irregular pavement surface. A durable, wear-resistant, polymeric top layer is adhered to one surface of the base sheet. The top layer is capable of undergoing brittle fracture at a temperature from 0° C. to 45° C. such that when the base sheet conforms an irregular surface, the top layer readily forms ruptures to relieve stress build-up in the top layer as the regions of the top layer defined by the ruptures remain adhered to, and follow the conformance of, the base sheet. A plurality of particles are embedded in and protrude from the top layer. The particles comprise retroreflective beads and skid-resistant granules. In a preferred embodiment, the top layer is characterized by a Young's modulus of from about 50,000 psi to about 300,000 psi, and a percent elongation at break of from about 4% to about 35%.

11 Claims, 2 Drawing Sheets

PAVEMENT MARKING MATERIAL WITH RUPTURING TOP LAYER

FIELD OF THE INVENTION

The present invention concerns an improved pavement marking material which may be adhered to a roadway to provide traffic control markings and the like.

BACKGROUND OF THE INVENTION

Preformed pavement marking materials are used as traffic control markings for a variety of uses, such as short distance lane striping, stop bars, and pedestrian lane markings at intersections. Typically, preformed pavement marking materials comprise a continuous, wear-resistant top layer overlying a flexible base sheet. Such materials are applied to substrates using pressure sensitive adhesive or contact cement.

For example, U.S. Pat. No. 4,020,211 discloses a preformed marking composite material comprising a continuous polyurethane top layer adhered to a flexible base sheet. These marking materials have a very high Young's modulus, well above 300,000 psi. As a result, these materials are so stiff and nonconformable that the entire composite material tends to come loose from irregular pavement surfaces due to poor adhesion to the pavement.

A more conformable preformed marking material comprising a more elastic, continuous polyurethane wear layer adhered to a flexible base sheet is described in assignee's copending application, U.S. Ser. No. 07/372,183 filed June 26, 1989, which is a continuation of U.S. Ser. No. 06/866,570, filed May 29, 1986, now abandoned. Similar materials are also described in U.S. Pat. Nos. 4,248,932; 4,117,192; 3,935,365; and in European Patent Application No. 0,162,229. These materials have better initial conformance to irregular pavement surfaces due to the lower modulus of the polyurethane wear layer. The elastic nature of the polyurethane wear layer, though, produces elastic tensile stresses in the top layer as these marking materials are adhered and conformed to the pavement. Over time, these stresses tend to cause adhesive failure, after which the marking materials would come loose from the pavement.

Assignee's copending application, U.S. Ser. No. 07/204,349, filed June 9, 1988, describes a pavement marking material comprising a polyurethane bead bond overlying a flexible base sheet having protrusions on one surface. The bead bond covers selected portions of these protrusions. One bead bond disclosed is a polyurethane urea comprising about two equivalents of bis (4-cyclohexyl isocyanate) ($H_{12}$:MDI) and about one equivalent of a polycaprolactone triol having a molecular weight of about 540 and a hydroxyl number of about 310.

SUMMARY OF THE INVENTION

The present invention provides an improved pavement marking material which comprises a wear-resistant top layer that can be conformed to irregular pavement surfaces without developing the elastic stresses that can lead to adhesive failure. Preferred pavement marking materials have the excellent durability characteristics of a tough, wear-resistant, hard top layer, while retaining the flexibility of an underlying conformance layer. As a result of these properties, the pavement marking materials of the present invention are long-lived and easily applied to a pavement having a rough or irregular surface.

The advantages of the present invention are achieved by a pavement marking material that comprises a flexible base sheet that is conformable to an irregular pavement surface. A durable, wear-resistant, polymeric top layer is adhered to one surface of the base sheet. The top layer is capable of undergoing brittle fracture at a temperature from 0° C. to 45° C. such that when the base sheet conforms to an irregular surface, the top layer readily forms ruptures to relieve stress build-up in the top layer as the regions of the top layer defined by the ruptures remain adhered to, and follow the conformance of, the base sheet. A plurality of particles are embedded in and protrude from the top layer. In a preferred embodiment, the top layer is characterized by a Young's modulus of from about 50,000 psi to about 300,000 psi, and a percent elongation at break of from about 4% to about 35%.

The pavement marking material according to the invention has greater conformability than can be achieved with a pavement marking material having a more elastic, top layer that resists rupturing. Practical tests have shown that preferred pavement marking materials are more lastingly adhered to irregular pavement surfaces than previously known materials. In a performance test that measured retention on the road, the closest performing previously known material failed at nearly twice the rate of the present invention. Further, in the same performance test, the present invention showed retained reflectivity and whiteness values that were as good as all, and better than most, of those values showed by the previously known materials.

The preferred materials also exhibit excellent durability. In a test using a Model No. 503 Standard Abrasion Tester, Taber Abraser, Teledyne Tabor, North Tonawonda, New York, which was fitted with an H-22 abrader wheel and a 1 kg weight, the preferred materials showed a weight loss of from 0.05 grams to about 0.30 grams over 1000 cycles.

DETAILED DESCRIPTION

Figure 1:
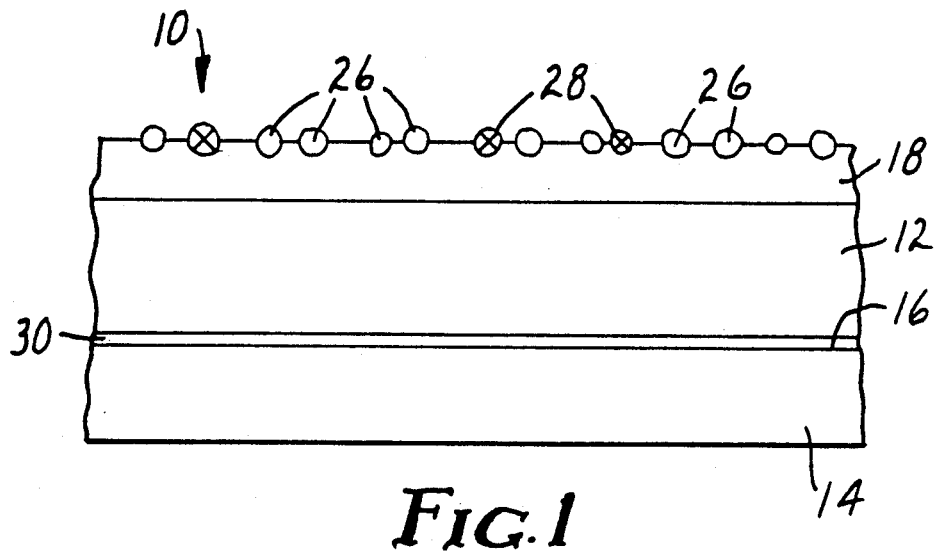
FIG. 1 is a side section of a preferred pavement marking material of the present invention.

Referring now to FIG. 1, there is shown a preferred embodiment of a pavement marking material 10 according to the present invention. The pavement marking material 10 comprises a flexible base sheet 12 that is conformable to an irregular pavement surface 16. Preferably, the base sheet 12 is substantially flat and has substantially no protrusions. Examples of suitable base sheets are the reduced-elasticity sheets taught in U.S. Pat. Nos. 4,117,192 or 4,490,432, which are incorporated herein by reference. Such reduced-elasticity base sheets comprise unvulcanized elastomer precursors, extender resins such as chlorinated paraffin, fillers, and nonwoven webs such as those made from spun-bonded polyolefins or polyesters.

The base sheet 12 is typically from about 20 to about 50 mils thick to provide desired conformability and strength to the substrate marking material. Most preferably, the base sheet 12 is 35 mils thick. Below about 20 mils, the base sheet 12 may not provide sufficient strength or support for the pavement marking material 10. Above about 50 mils, the marking material 10 may stick up too far from the pavement 14 such that snow plows may damage or dislodge the marking material 10. Above about 50 mils, cost also becomes a concern.

Optionally, pigments may be added to the base sheet 12 for coloration. Titanium dioxide will impart a white color to the base sheet 12. Another useful pigment is lead chromate, which imparts a yellow color to the base sheet 12. Particulate fillers may also be included in the base sheet 12, typically in large amounts, to lower cost and to provide modified properties, such as reinforcement, extending, surface hardness, and abrasion resistance.

Figure 2:
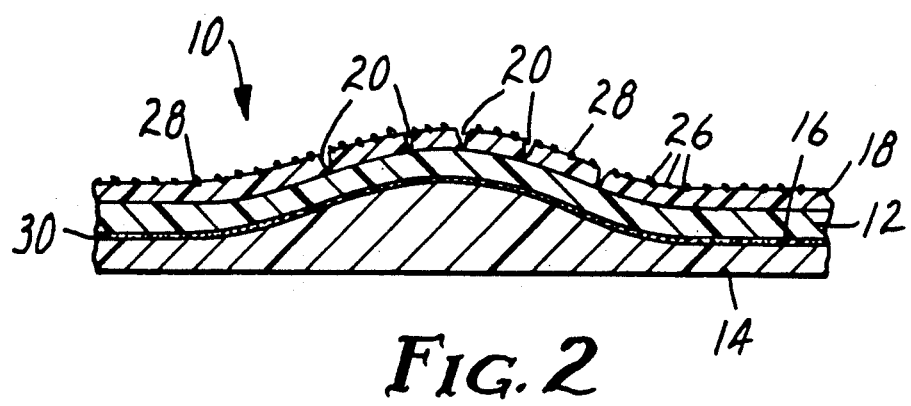
FIG. 2 is a sectional showing the pavement marking material of FIG. 1 adhered to an irregular pavement surface wherein ruptures are formed in the top layer.

A durable, wear-resistant, polymeric top layer 18 is adhered to one surface of the base sheet 12. The top layer 18 is capable of undergoing brittle fracture at a temperature from 0° C. to 45° C., and more preferably at a temperature from 0° C. to 35° C. As seen best in FIG. 2, the top layer 18 readily forms ruptures 20 in those areas where the pavement surface 16 is rough or irregular. The top layer 18 forms ruptures 20 when the conformance of the top layer to an irregular surface exceeds the elongation to break of the top layer. The top layer 18, however, generally does not rupture where the underlying surface is smooth.

The pavement marking material 10 has greater conformability than can be achieved with a pavement marking material having a more elastic top layer that resists rupturing. When a more elastic top layer is deformed in order to conform to an irregular or rough pavement surface, elastic stresses develop in the top layer. These stresses tend to pull back against the adhesive used to hold the pavement marking material to the pavement. Over time, these forces tend to cause the adhesive to fail, after which the pavement marking material would come loose from the pavement.

In the present invention, however, the energy of such elastic stresses is not stored in the top layer 18. Instead, as the top layer 18 conforms to the pavement 14, such energy is dissipated by the formation of ruptures 20. Thus, the elastic stresses that can cause the pavement marking material 10 to come loose from the pavement 14 are reduced, or eliminated. As a result, the present invention has improved long-term adhesion to pavements having rough or irregular surfaces. After rupturing, the top layer 18 continues to act as a durable, wear-resistant layer.

The ruptures 20 are macrocracks, not microcracks, in the top layer. Macrocracks, forming as a result of brittle fracture, typically pass through the entire top layer 18 and effectively relieve stress build-up in the top layer 18. There is a distance of from 1 mm to 50 mm between such cracks. Macrocracks do not impair the whiteness of a pavement marking material as much as microcracks. Microcracks form only on the surface of the top layer 18 and are not effective for relieving stress build-up in the top layer 18. As a further difference, there is a distance of only from 10 to 100 microns between microcracks.

Preferably the top layer 18 has a Young's modulus of from 50,000 psi (350 MPa) to 300,000 psi (2100 MPa), and more preferably from 50,000 psi (350 MPa) to 250,000 psi (1750 MPa). If the modulus is too low, the top layer 18 may not have sufficient wear-resistant properties. If the modulus is too high, then the top layer 18 may not have sufficient conformability characteristics. It is also preferred that the top layer 18 have a percent elongation at break of from 4% to 35%, more preferably from 4% to 20%, and most preferably from 4% to 10%.

When testing a polyurethane for tensile properties, the following test procedure was used: The polyurethane was cast onto a coated paper liner and cured in an oven for 10 to 15 minutes at a temperature from 120° C. to 135° C. After cooling, the polyurethane was removed from the paper liner and cut into 0.5 inch (1.3 cm) by 6 inch (15.2 cm) strips. These strips were preconditioned at 72° F. (22.2° C.) and 50% relative humidity for 48 hours. They were then secured in the jaws of an Instron Universal Testing Instrument, Instron Corporation, Canton, Massachusetts, set 4 inches (10.2 cm) apart. The jaws were then driven apart at 10 inches per minute (25.4 cm/min) until the sample broke. The force required to effect this separation was plotted and recorded. Elongation at break was measured based upon the (inches of elongation/4 inches)×100%. The elastic modulus (Young's modulus) was determined based upon the ratio of force required in straining the sample to 1% strain divided by the cross sectional area of the sample.

Referring again to FIG. 1, suitable polymeric materials for the top layer 18 include polyurethanes, epoxy resins, polyamides, polyureas, and polyesters. Mixtures of such materials would also be suitable in the present invention. Suitable polymeric materials may also be either thermoplastic or thermosetting polymers.

Preferably, the top layer 18 comprises a polyurethane. Polyurethanes generally are characterized by excellent adhesion to particles 26 and 28 which are subsequently embedded in the top layer. Preferred polyurethanes are aliphatic polyurethanes. Aliphatic polyurethanes strongly adhere to the base sheet 12, are highly cohesive, and are resistant to environmental weathering.

One example of a polyurethane suitable for use in the present invention is derived from a polyol component and a polyisocyanate, wherein the equivalent ratio of NCO groups of the polyisocyanate to the OH groups of the polyol component is from about 0.5 to about 1.5, and preferably about 1.05. The polyol component may be a mixture of any low molecular weight polyols and/or polymeric polyols, so long as the resulting polyurethane exhibits brittle fracture from 0° C. to 45° C.

Preferably, the polyol component comprises one or more polyols having an average molecular weight of from about 300 to about 660, an average hydroxyl equivalent weight of from about 100 to about 220, and an average of about 3 or more hydroxyl groups per polyol. More preferably, the polyol component comprises about one equivalent of a polycaprolactone triol having a hydroxyl equivalent weight of about 100, and from 0 to 0.33 equivalents of a polycaprolactone triol having a hydroxyl equivalent weight of about 300.

The polyisocyanate is preferably an aliphatic compound, since such compounds show less discoloration than aromatic compounds during outdoor weathering. Polyisocyanate compounds which have aromatic rings which are not bonded directly to the isocyanate groups, but rather are bonded to a hydrogen-free carbon atom, are also useful. Compounds of this type are disclosed in U.S. Pat. Nos. 4,377,530 and 4,379,767.

Useful polyisocyanates include isophorone diisocyanate; 4,4'-methylene-bis-cyclohexyl diisocyanate tetramethylene diisocyanate; 1,3 and 1,4 cyclohexyl diisocyanate; 1,6 hexamethylene diisocyanate; adducts of 1,6 hexamethylene diisocyanate; isomers of tetramethylxylylene diisocyanate; or isocyanate terminated polymers derived from polyols and difunctional aliphatic isocyanates.

In a particularly preferred polyurethane, the polyol component comprises about 100 parts by weight of a polycaprolactone triol having a molecular weight of about 300, such as Tone 0301 available from Union Carbide Company. The polyol component also comprises from 0 to 100 parts by weight, preferably from 10 to 25 parts by weight, and more preferably about 19 parts by weight, of a polycaprolactone triol having a molecular weight of about 960, such as Tone 0310 available from Union Carbide Company. The lower molecular weight triol imparts rigidity to the polyurethane, whereas the higher molecular weight triol is used to lower the modulus of the polyurethane. If too much of the higher molecular weight triol is used, however, the polyurethane will not have sufficient wear-resistance. Additionally, if too much of the higher molecular weight triol is used, the polyurethane may be too elastic to exhibit desirable rupturing characteristics.

The particularly preferred polyurethane also comprises from about 190 to about 230 parts by weight, and preferably about 210 parts by weight, of a biuret adduct of 1,6 hexamethylene diisocyanate, such as Desmodur N-100 available from Mobay Chemical Division of U.S. Bayer. For the particularly preferred polyurethane, the equivalent ratio of NCO groups of the polyisocyanate to the OH groups of the polyol component is about 1.05.

The top layer 18 may also comprise a variety of inorganic additives such as inert fillers, extenders, and pigments as are used in known pavement marking materials. The various inorganic additives may be treated with a coupling agent such as a silane coupling agent to improve bonding to polyurethane polymers. Inert fillers include alumina; magnesium silicate; magnesium oxide; calcium carbonate; calcium meta silicates; amorphous or crystalline silica; zinc oxide; lead chromate; and zirconium oxide.

Pigments or other coloring agents may be included in the top layer 18 in an amount sufficient to color the marking material for a particular use. For example, when used as a pavement marking material, titanium oxide is a desired pigment and filler to provide a white color and to provide a diffuse reflective background for retroreflective beads 26 subsequently embedded in the top layer 18, whereas, lead chromate will typically be used to provide a yellow color.

The top layer 18 is at least from about 4 mils to about 30 mils thick. Preferably, the top layer 18 is from about 12 to about 16 mils thick, and most preferably about 13 mils thick. If the top layer 18 is not thick enough, the top layer 18 may not provide sufficient bonding to particles subsequently embedded in the top layer. If the top layer 18 is too thick, the overall structure may be too rigid to achieve desired conformance characteristics. If the top layer 18 is too thick, costs also become a concern.

The top layer 18 is preferably a branched, cross-linked polymer network. Cross-linking contributes to the desired rupturing characteristics. Cross-linking is also believed to contribute to the wear resistance of the substrate marking material 10. It has also been found that as the polymeric top layer 18 is more highly cross-linked, the top layer shows better resistance to discoloration from tires that travel over the marking, or from other oil, dirt, or grime that may come into contact with the substrate marking material 10.

The top layer 18 is generally formed by coating liquid ingredients directly onto the base sheet 12. The top layer 18, however, may be formed separately, and then bonded to the base sheet 12 in a laminating operation, as by interposing an adhesive layer (not shown in FIG. 1 and FIG. 2) between the top layer 18 and the base sheet 12.

A plurality of particles 26 and 28 are embedded in and protrude from the top layer 18. The particles 26 and 28 comprise retroreflective beads 26 and skid-resistant granules 28. The particles 26 and 28 may be applied to the still-liquid top layer 18 by a flood coating process which results in a dense packing of particles 26 and 28 in the top layer 18. Alternatively, the particles 26 and 28 may be sprinkled or cascaded onto the top layer 18 such that a dense packing of particles 26 and 28 is avoided. The sprinkling process is particularly advantageous to minimize particle usage, to decrease dirt retention between particles, and to optimize retroreflection.

When the particles 26 and 28 are embedded in the top layer, the fracture stress required to rupture the top layer is significantly less than the fracture stress required in the absence of such particles. Previously known materials generally have been formulated with elastomeric materials which are intended to resist such rupturing. Unlike previously known materials, the present invention does not try to resist the natural tendency of the top layer to rupture, but rather uses this tendency to advantage.

Retroreflective beads 26 suitable for use in the present invention include glass beads having an index of refraction of from about 1.5 to about 1.9. Glass beads having an index of refraction closer to about 1.5 are less costly and more scratch and chip resistant. However, glass beads having an index of refraction of from about 1.7 to about 1.9 are more effective retroreflectors.

Preferred retroreflective beads 26 are described in U.S. Pat. Nos. 4,564,556 and 4,758,469, which are incorporated herein by reference. The preferred beads are described as solid, transparent, nonvitreous ceramic spheroids comprising at least one crystalline phase comprised of a metal oxide. These beads may also have an amorphous phase, such as an amorphous silica phase. The term nonvitreous means that the beads have not been derived from a melt or mixture of raw materials brought to the liquid state at high temperature. These beads are extremely resistant to scratching or chipping and can be made with an index of refraction of from about 1.4 to 2.6.

Skid-resistant granules 28 are used to provide a marking material having a residual skid resistance in the British Portable Skid Resistance test of at least 50 BPN. BPN means the British Portable Number as measured using a Portable Skid Resistance Tester built by Road Research Laboratory, Crawthorne, Berkshire, England. Suitable skid-resistant granules 28 include white aluminum oxide granules. It has been found that a blend of fine aluminum oxide granules and larger aluminum oxide granules provides acceptable, long-lasting skid-resistance. A preferred skid-resistant granule is described in assignee's copending application, U.S. Ser.

No. 07/241,318, filed Sept. 7, 1988, incorporated herein by reference. These granules are described as ceramic spheroids that are a fired ceramic comprising a mineral particulate, alumina, and a binder. These spheroids are extremely durable and impart excellent skid-resistant characteristics to pavement marking materials.

The particles 26 and 28 may be treated with a coupling agent that improves adhesion between the particles 26 and 28 and the top layer 18. Alternatively, such an agent may be included in the top layer 18 so that the agent interacts with the particles 26 and 28 when the particles 26 and 28 are embedded in the top layer 18. These agents typically comprise an inorganophilic portion, which associates with the particles 26 and 28, and an organophilic portion, which associates with and may react with organic ingredients of the top layer 18. Preferred agents are silane compounds, such as the aminosilane compounds.

One factor affecting the performance of the preferred pavement marking material 10 concerns the viscosity of the top layer 18 during the curing process. The viscosity of the particularly preferred polyurethane described above has a propensity to drop as the top layer 18 is heated for curing. If particles 26 and 28 are added to the top layer 18 during this low viscosity stage, the particles 26 and 28 could sink to the bottom of the top layer 18 where the effectiveness of the particles 26 and 28 would be decreased. To overcome this problem, the top layer 18 is preferably precured to increase the viscosity of the top layer 18 before the particles 26 and 28 are applied to the top layer 18. To accomplish this, the polyurethane top layer 18 is heated at about 150° C. for a time sufficient to adjust the viscosity of the top layer 18 such that the particles 26 and 28 sink into the top layer up to about one half the diameter of the particles.

An adhesive layer 30 may be carried on the bottom surface of the base sheet 12 for application to substrate 14. Alternatively, an adhesive layer 30 may be applied first to substrate 14 after which the substrate marking material 10 is adhered over the adhesive layer 30. Pressure sensitive adhesives are preferred. Contact adhesives may also be used.

Figure 3:
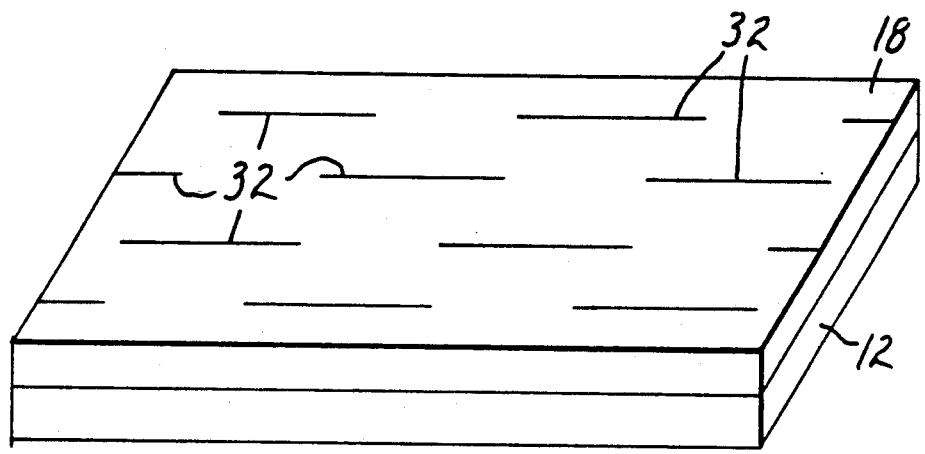
FIG. 3 is a perspective view of an alternative embodiment of the present invention wherein the ruptures comprise a plurality of cuts made in the top layer.
Figure 4:
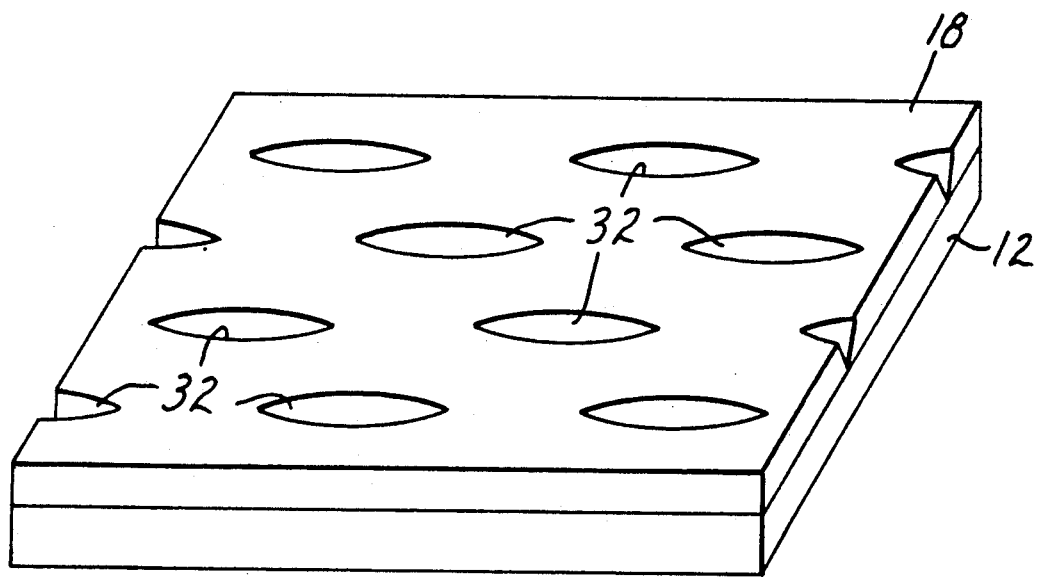
FIG. 4 is a perspective view, wherein the pavement marking material of FIG. 3 has been flexed.

An alternative embodiment of the present invention is shown in FIG. 3 and FIG. 4. In FIG. 3, a pavement marking material comprising a top layer 18 adhered to a base sheet 12 is shown. In this embodiment, ruptures in the top layer 18 comprise a plurality of cuts 32 made in the top layer. The cuts 32 are made in the top layer 18 before the pavement marking materials is applied to a pavement surface. The cuts 32 facilitate the conformance of the top layer 18 to irregular pavement surfaces, while at the same time, relieving stress build-up in the top layer 18 as it is being flexed. FIG. 4 shows the pavement marking material of FIG. 3 being flexed so as to conform to an irregular pavement surface.

The invention will be further described with reference to the following Examples.

EXAMPLE 1

A pavement marking material with a top layer comprising the particularly preferred polyurethane was prepared. The top layer included the following ingredients:

| Ingredient | | Parts By Weight |
|---|---|---|
| Tone 0301 - | polycaprolactone triol | 100 |

-continued

| Ingredient | | Parts By Weight |
|---|---|---|
| Tone 0310 - | having a molecular weight of 303 available from Union Carbide Company polycaprolactone triol having a molecular weight of 966 available from Union Carbide Company | 10 |
| titanium dioxide pigment | | 64.5 |
| Desmodur N-100 - | biuret adduct of 1,6 hexamethylene diisocyanate available from Mobay Chemical Division of U.S. Bayer | 205 |

The first three ingredients listed above were thoroughly mixed using a high speed, low shear Cowles Dissolver mixing device available from C. Cowles and Company, New Haven, Connecticut. Next, the resulting mixture was combined with Desmodur N-100 and coated 18 mils thick onto a 35 mil, highly filled, calendered, flexible acrylonitrile butadiene rubber sheet. After curing the coating for 3 minutes at 150° C., glass beads (600 micron, 1.5 index beads, treated with 3-amino propyl triethoxy silane commercially available as A1100 from Union Carbide Company) and skid-resistant particles (#30 grit aluminum oxide, treated with 3-amino propyl triethoxy silane commercially available as A1100 from Union Carbide Company) were sprinkled over the surface of the coating. Cure was completed at 163° C. for 2 minutes. The resulting pavement marking material, Sample A, was installed using contact cement in a high ADT intersection on Sept. 27, 1987. "High ADT intersection" means an intersection in which the average daily traffic is from 8,000 to 10,000 vehicles per day per lane. Periodic inspections were made after 1.5 months, 4 months, and 1 year. Comparison samples of other pavement marking materials were installed in the same intersection and inspected at the same times. These comparison samples were as follows:

Comparison Sample 1: pavement commercially available as Catatile from Cataphote Corporation, the U.S. distributor for Roline 55, Nirosa SPA, Milan, Italy.

Comparison Sample 2: pavement marking material commercially available as Stamark 5760 from Minnesota Mining and Manufacturing Company, St. Paul, Minnesota.

Performance of the samples was measured on the basis of % reflectivity retention in terms of MCD, where MCD means millicandela per lux per m$^2$ using an Ecolux Retroreflectometer; whiteness in terms of Cap Y using a Minolta colorimeter; and retention on the road in terms of percent product lost. Field performance results are summarized below:

| | INITIAL VALUES | 1.5 MONTHS | 4 MONTHS | 1 YEAR |
|---|---|---|---|---|
| Sample A | | | | |
| Reflectivity (MCD) | 100% | 57% | 15% | 20% |
| Whiteness (Cap Y) | 85 | 65 | 60 | 52 |
| % Product Lost | 0 | 0 | 0 | 3.7 |
| Comparison Sample 1 | | | | |
| Reflectivity | 100% | 27% | 7% | 11% |

| | INITIAL VALUES | 1.5 MONTHS | 4 MONTHS | 1 YEAR |
|---|---|---|---|---|
| (MCD) | | | | |
| Whiteness (Cap Y) | 86 | — | — | 49 |
| % Product Lost | 0 | 0 | 0.2 | 6.5 |
| Comparison Sample 2 | | | | |
| Reflectivity (MCD) | 100% | 19% | 13% | 30% |
| Whiteness (Cap Y) | 82 | 53 | 54 | 50 |
| % Product Lost | 0 | 0 | 0 | 17.5* |

*Product worn through, no adhesive loss noted

As can be seen from the results, improvements in reflectivity retention, whiteness, and reduction in product loss were achieved by the present invention.

After 1.5 months: Sample A of the present invention showed a reflectivity of 57%, whereas the closest performing comparison sample showed a reflectivity of only 27%. Sample A also showed better whiteness than Comparison Sample 2. The whiteness of Comparison Sample 1 was not measured at this time. None of the samples showed any measurable percent product lost at this time.

After 4 months: Sample A again showed better reflectivity and whiteness than the other samples. None of the samples showed significant percent product lost at this time.

After 1 year: Significant reduction in percent product lost was achieved by the present invention. The present invention, Sample A, showed a percent product lost of only 3.7%. The closest performing comparison sample experienced a product lost of 6.5%. Sample A also showed better whiteness than the other samples, although Comparison Sample 2 showed the best reflectivity at this time.

Inspection of the samples after 1 year indicated that the present invention had ruptured in areas where the pavement was uneven, thereby relieving tensile stresses which had been imposed in the polyurethane top layer. In addition, it was noted by using scanning electron microscopy that the present invention showed better particle retention in the top layer than the other samples. It was also noted that the top layer of the invention had not worn through after one year in this test, but that the top layer of Comparison Sample 1 and Comparison Sample 2 had worn through and exposed the underlying base sheet.

COMPARISON EXAMPLE 1

A sample of the polyurethane disclosed in U.S. Pat. No. 4,020,211 (Eigenmann) at column 5, lines 16-27, was made by making a film of the composition disclosed and testing the tensile properties. It was found that this film has a higher modulus (362,000 PSI, +/−32,000) and a lower elongation at break (2.0%, +/−0.6%) than the properties that are preferred for the present invention. For purposes of comparison, this polyurethane, due to its high modulus and its lower elongation at break, would show excessive cracking, excessive dirt pickup, and discoloration.

Other embodiments of this invention will be apparent to those skilled in the art upon consideration of this specification or from practice of the invention disclosed herein. Various modifications and changes may be made by one skilled in the art without departing of the true scope and spirit of the invention which is indicated by the following claims.

What is claimed is:

1. A pavement marking material, comprising:
   (a) a flexible base sheet that is conformable to an irregular pavement surface;
   (b) a durable, wear-resistant, polymeric top layer adhered to one surface of the base sheet, wherein the top layer is capable of undergoing brittle fracture at a temperature from 0° C. to 45° C. such that when the base sheet conforms to an irregular surface, the top layer readily forms ruptures to relieve stress build-up in the top layer as the regions of the top layer defined by the ruptures remain adhered to, and follow the conformance of, the base sheet, and wherein the top layer has a Young's Modulus from 50,000 psi (350 MPa) to 300,000 psi (2100 MPa) and a percent elongation at break of from 4% to 35%.; and
   (c) a plurality of particles embedded in and protruding from the top layer.

2. The pavement marking material according to claim 1, wherein the flexible base sheet is substantially flat and has substantially no protrusions.

3. The pavement marking material according to claim 1, wherein the top layer has a Young's Modulus from 50,000 psi (350 MPa) to 250,000 psi (1750 MPa).

4. The pavement marking material according to claim 1, wherein the top layer has a percent elongation at break from 4% to 20%.

5. The pavement marking material according to claim 4, wherein the top layer has a percent elongation at break from 4% to 10%.

6. The pavement marking material according to claim 1, wherein a plurality of ruptures are formed in the top layer.

7. The pavement marking material according to claim 1, wherein the top layer comprises a polymer selected from the group consisting of polyurethane, epoxy resin, polyamide, polyurea, polyester, and mixtures thereof.

8. The pavement marking material according to claim 1, wherein the top layer comprises a polymer selected from the group consisting of a polyurethane, a polyurea, and mixtures thereof.

9. The pavement marking material according to claim 1, wherein the top layer comprises a polyurethane that is obtained from reactants comprising:
   (a) a polyol component comprising one or more polyols, wherein said polyols have an average molecular weight from about 300 to about 660, an average hydroxyl equivalent weight from about 100 to about 220, and an average of about three or more hydroxyl groups per polyol; and
   (b) a polyisocyanate, wherein the equivalent ratio of NCO groups of the polyisocyanate to OH groups of the polyol component is from about 0.5 to about 1.5.

10. The pavement marking material according to claim 9, wherein:
   (a) the polyol component comprises about one equivalent of a polycaprolactone triol having a hydroxyl equivalent weight of about 100; and from 0 to about 0.33 equivalents of a polycaprolactone triol having a hydroxyl equivalent weight of about 300; and
   (b) the polyisocyanate is an adduct of 1, 6 hexamethylene diisocyanate.

11. The pavement marking material according to claim 1, wherein the top layer comprises a polyurethane that is obtained from reactants comprising:
 (a) about 100 parts by weight of a polycaprolactone triol having a molecular weight of about 300; and
 (b) from about 10 to about 25 parts by weight of a polycaprolactone triol having a molecular weight of about 960; and
 (c) about 205 parts by weight of a biuret adduct of 1,6 hexamethylene diisocyanate having an isocyanate equivalent weight of from about 150 to 250.

* * * * *

UNITED STATES PATENT AND TRADEMARK OFFICE
CERTIFICATE OF CORRECTION

PATENT NO. : 5,077,117

DATED : December 31, 1991

INVENTOR(S) : Harper et al.

It is certified that error appears in the above-identified patent and that said Letters Patent is hereby corrected as shown below:

Col. 1, line 53, "($H_{12}$:MDI)" should be --($H_{12}$MDI)--.

Signed and Sealed this

Eighth Day of June, 1993

Attest:

MICHAEL K. KIRK

Attesting Officer

Acting Commissioner of Patents and Trademarks